(12) United States Patent
Sagawa et al.

(10) Patent No.: US 9,621,098 B2
(45) Date of Patent: Apr. 11, 2017

(54) VOLTAGE CONTROL DEVICE AND VOLTAGE CONTROL METHOD

(71) Applicant: Komatsu Ltd., Tokyo (JP)

(72) Inventors: Tomohiko Sagawa, Hiratsuka (JP); Tetsuo Yoshida, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/783,541

(22) PCT Filed: May 29, 2015

(86) PCT No.: PCT/JP2015/065675
§ 371 (c)(1),
(2) Date: Oct. 9, 2015

(87) PCT Pub. No.: WO2015/174551
PCT Pub. Date: Nov. 19, 2015

(65) Prior Publication Data
US 2016/0352277 A1    Dec. 1, 2016

(51) Int. Cl.
*H02P 25/08* (2016.01)
(52) U.S. Cl.
CPC .................... *H02P 25/08* (2013.01)
(58) Field of Classification Search
CPC ...................................................... H02P 25/08
USPC .......................................... 318/254, 34, 558
See application file for complete search history.

(56) References Cited

U.S. PATENT DOCUMENTS

| 5,670,851 A * | 9/1997 | Numazaki ............. B60L 3/0023 318/106 |
| 6,348,743 B1 | 2/2002 | Sakasai et al. |
| 8,456,128 B2 * | 6/2013 | Fotherby ................ H02M 7/48 318/106 |
| 2009/0207636 A1 | 8/2009 | Huynh et al. |

(Continued)

FOREIGN PATENT DOCUMENTS

| JP | 2001-028900 A | 1/2001 |
| JP | 2015-006037 A | 1/2015 |

(Continued)

OTHER PUBLICATIONS

International Search Report and Written Opinion mailed Aug. 18, 2015, issued for PCT/JP2015/065675.

*Primary Examiner* — David S Luo
(74) *Attorney, Agent, or Firm* — Locke Lord LLP

(57) ABSTRACT

A voltage control device includes: a capacitor configured to supply power to a rotating electrical machine; an inverter connected to the rotating electrical machine; a transformer coupled booster including two voltage source inverters of which direct current terminals are connected in series to have additive polarity, and a transformer configured to couple alternate current terminals of the two voltage source inverters and having a predetermined leak inductance, wherein one of the two voltage source inverters is connected to the capacitor in parallel, and the transformer coupled booster outputs, to the inverter, a direct-current voltage which is a raised capacitor voltage of the capacitor; and a controller configured to generate and output an instruction value of the direct-current voltage at a time the rotating electrical machine is in a drive state and the output of the transformer coupled booster is less than a predetermined output.

16 Claims, 8 Drawing Sheets

(56) References Cited

U.S. PATENT DOCUMENTS

| | | |
|---|---|---|
| 2010/0014323 A1 | 1/2010 | Sato |
| 2010/0071973 A1 | 3/2010 | Morinaga et al. |
| 2010/0090628 A1 | 4/2010 | Endo et al. |
| 2010/0097037 A1 | 4/2010 | Morinaga et al. |

FOREIGN PATENT DOCUMENTS

| | | |
|---|---|---|
| JP | 2015-046985 A | 3/2015 |
| WO | WO-2008/099884 A1 | 8/2008 |
| WO | WO-2008/111649 A1 | 9/2008 |
| WO | WO-2008/117748 A1 | 10/2008 |
| WO | WO-2008/123368 A1 | 10/2008 |

\* cited by examiner

VOLTAGE CONTROL DEVICE AND VOLTAGE CONTROL METHOD

FIELD

The present invention relates to a voltage control device and a voltage control method for controlling direct-current voltage obtained by converting voltage of a capacitor which is a storage battery.

BACKGROUND

A hybrid work vehicle equipped with an engine and a rotating electrical machine as drive sources has a storage battery such as a battery for supplying power to the rotating electrical machine and for storing electric power generated by the rotating electrical machine. In the hybrid work vehicle with this configuration, voltage control of the rotating electrical machine is generally executed focusing on efficiency of an inverter that drives the rotating electrical machine.

Patent Literature 1 discloses a booster that boosts a voltage of a capacitor and outputs the voltage to a system voltage of a rotating electrical machine in a hybrid work vehicle.

CITATION LIST

Patent Literature

Patent Literature 1: International Publication Pamphlet No. WO 2008/099884

SUMMARY

Technical Problem

However, the booster described in Patent Literature 1 does not consider anything about load changes of the rotating electrical machine. In other words, according to the booster described in Patent Literature 1, the capacitor voltage is output after the voltage is raised at a rated voltage to the system voltage and the output voltage of the booster is nearly maximum. In this condition, when load of the rotating electrical machine increases, the booster cannot increase the output voltage and cannot supply a sufficient output to a rotating equipment.

The present invention is made in view of the above and has an object to provide a voltage control device and a voltage control method that can obtain an output corresponding to load changes.

Solution to Problem

To solve the problem and achieve the object, a voltage control device according to the present invention includes: a capacitor configured to supply power to a rotating electrical machine; an inverter connected to the rotating electrical machine; a transformer coupled booster including: two voltage source inverters of which direct current terminals are connected in series to have additive polarity; and a transformer configured to couple alternate current terminals of the two voltage source inverters, the transformer having a predetermined leak inductance, wherein one of the two voltage source inverters is connected to the capacitor in parallel, and the transformer coupled booster outputs, to the inverter, a direct-current voltage which is a raised capacitor voltage of the capacitor; and a controller configured to generate and output an instruction value of the direct-current voltage which is variable corresponding to the capacitor voltage within a predetermined range, in a range less than a predetermined upper limit voltage of the direct-current voltage and not less than a predetermined lower limit voltage of the direct-current voltage at a time the rotating electrical machine is in a drive state and the output of the transformer coupled booster is less than a predetermined output which is less than an output limit of the transformer coupled booster.

Moreover, in the voltage control device according to the present invention, the controller is further configured to generate and output the instruction value of the direct-current voltage which is variable corresponding to the capacitor voltage within the predetermined range, in a range between the predetermined upper limit voltage and the predetermined lower limit voltage of the direct-current voltage at a time the controller determines that a rotation speed of the rotating electrical machine is less than a predetermined rotation speed.

Moreover, in the voltage control device according to the present invention, the predetermined range of the capacitor voltage is a range less than a variable control upper limit threshold value which is a value of a capacitor voltage corresponding to the predetermined upper limit voltage with which a direct-current voltage boosting ratio for the capacitor voltage becomes a most preferable boosting ratio that leads high efficiency of the transformer coupled booster, and the controller is configured to generate, within the predetermined range of the capacitor voltage, the instruction value of the direct-current voltage that leads the most preferable boosting ratio as the capacitor voltage reduces from the variable control upper limit threshold value, and generate the predetermined lower limit voltage as the instruction value of the direct-current voltage at a time the capacitor voltage is not greater than a variable control lower limit threshold value which is a value of the capacitor voltage at a timing that the direct-current voltage with the most preferable boosting ratio becomes a predetermined lower limit voltage.

Moreover, in the voltage control device according to the present invention, at a time of determining whether or not the output of the transformer coupled booster is less than a predetermined output that is less than an output limit, the controller is configured to use a hysteresis characteristic in the predetermined output in a range not greater than the predetermined output.

Moreover, in the voltage control device according to the present invention, at a time of determining whether or not the rotation speed of the rotating electrical machine is less than a predetermined rotation speed, the controller is configured to use a hysteresis characteristic in the predetermined rotation speed in a range not greater than the predetermined rotation speed.

Moreover, in the voltage control device according to the present invention, the controller is configured to generate the predetermined upper limit voltage as the instruction value of the direct-current voltage at a time the rotating electrical machine is in a drive state, the output of the transformer coupled booster is not less than the predetermined output that is a value less than an output limit, and the capacitor voltage is not less than a derating operation threshold value.

Moreover, in the voltage control device according to the present invention, the controller is configured to generate and output the predetermined upper limit voltage as the instruction value of the direct-current voltage while the rotating electrical machine is in a drive state, at a time the output of the transformer coupled booster is not less than the predetermined output that is a value less than the output limit, or at a time the rotation speed of the rotating electrical machine is not less than the predetermined rotation speed and the capacitor voltage is not less than a derating operation threshold value.

Moreover, in the voltage control device according to the present invention, the rotating electrical machine is a permanent-magnet motor.

Moreover, a voltage control method of a system according to the present invention is a voltage control method of a system including: a capacitor configured to supply power to a rotating electrical machine; an inverter connected to the rotating electrical machine; and a transformer coupled booster including: two voltage source inverters of which direct current terminals are connected in series to have additive polarity; and a transformer configured to couple alternate current terminals of the two voltage source inverters, the transformer having a predetermined leak inductance, wherein one of the two voltage source inverters is connected to the capacitor in parallel, and the transformer coupled booster outputs, to the inverter, a direct-current voltage which is a raised capacitor voltage of the capacitor, and the voltage control method includes generating and outputting an instruction value of the direct-current voltage which is variable corresponding to the capacitor voltage within a predetermined range, in a range less than a predetermined upper limit voltage of the direct-current voltage and not less than a predetermined lower limit voltage of the direct-current voltage at a time the rotating electrical machine is in a drive state and the output of the transformer coupled booster is less than a predetermined output which is less than an output limit of the transformer coupled booster.

Moreover, the above-described voltage control method according to the present invention further includes generating and outputting the instruction value of the direct-current voltage which is variable corresponding to the capacitor voltage within the predetermined range, in a range between the predetermined upper limit voltage and the predetermined lower limit voltage of the direct-current voltage at a time a rotation speed of the rotating electrical machine is less than a predetermined rotation speed.

Moreover, in the above-described voltage control method according to the present invention, the predetermined range of the capacitor voltage is a range less than a variable control upper limit threshold value which is a value of a capacitor voltage corresponding to the predetermined upper limit voltage with which a direct-current voltage boosting ratio for the capacitor voltage becomes a most preferable boosting ratio that leads high efficiency of the transformer coupled booster, and the method including generating, within the predetermined range of the capacitor voltage, the instruction value of the direct-current voltage that leads the most preferable boosting ratio as the capacitor voltage reduces from the variable control upper limit threshold value, and generating the predetermined lower limit voltage as the instruction value of the direct-current voltage at a time the capacitor voltage is not greater than a variable control lower limit threshold value which is a value of the capacitor voltage at a timing that the direct-current voltage with the most preferable boosting ratio becomes a predetermined lower limit voltage.

According to the present invention, included are a capacitor that supplies power to a rotating electrical machine, an inverter connected to the rotating electrical machine, a transformer coupled booster that includes two voltage source inverters of which direct current terminals are connected in series to have additive polarity and a transformer configured to couple alternate current terminals of the two voltage source inverters, the transformer having a predetermined leak inductance, wherein one of the two voltage source inverters connected to the capacitor in parallel, and the transformer coupled booster outputs, to the invertor, a direct-current voltage which is made by boosting the capacitor voltage of the capacitor. An instruction value of the direct-current voltage which is variable corresponding to the capacitor voltage within a predetermined range, in a range less than a predetermined upper limit voltage of the direct-current voltage and not less than a predetermined lower limit voltage at a time the rotating electrical machine is in a drive state and an output of the transformer coupled booster is less than the predetermined output which is a value less than an output limit of the transformer coupled booster is generated and output. With this, the transformer coupled booster can obtain an output corresponding to a load change of the rotating electrical machine.

DESCRIPTION OF EMBODIMENTS

Hereinafter, an embodiment of the present invention will be explained with reference to the drawings.

(Entire Configuration)

Figure 1:
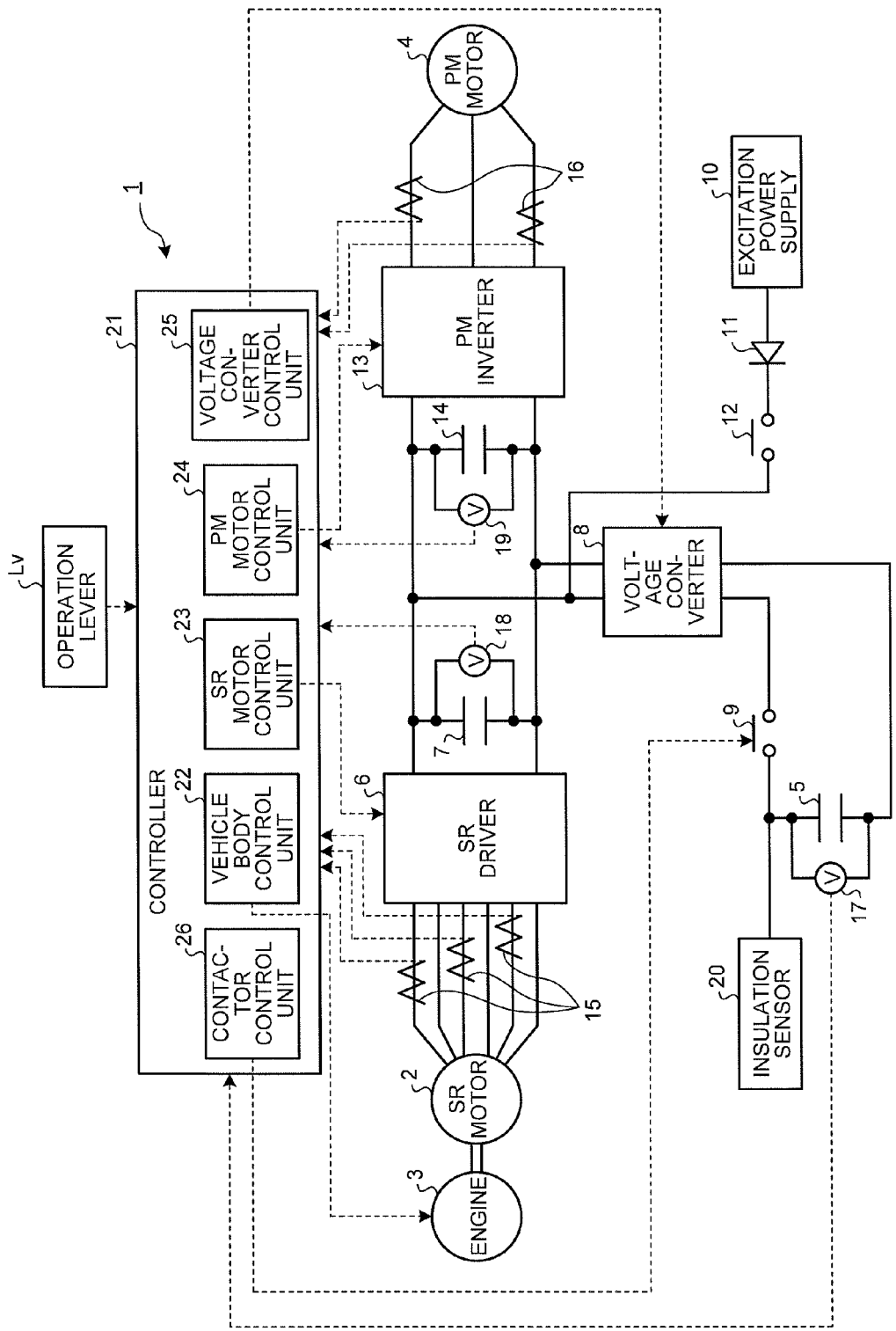
FIG. 1 is a block diagram illustrating a configuration of a voltage control device as an embodiment of the present invention.
Figure 2:
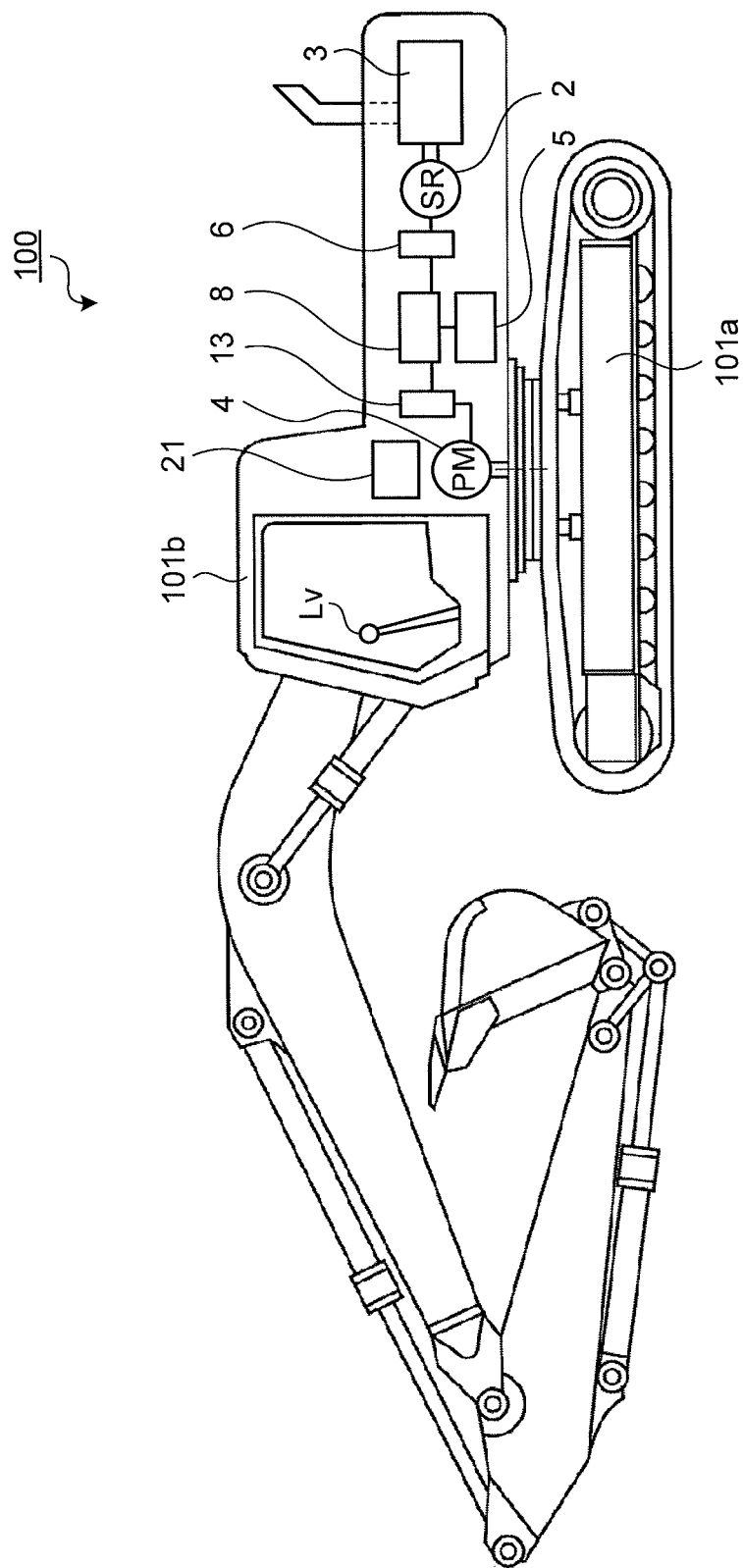
FIG. 2 is a diagram illustrating a configuration of an excavator in which the voltage control device of FIG. 1 is mounted.

FIG. 1 is a block diagram illustrating a configuration of a voltage control device 1 according to an embodiment of the present invention. The voltage control device 1 illustrated in FIG. 1 is a power control system mounted on a hybrid work vehicle. The hybrid work vehicle equipped with the voltage control device 1 is, for example, an excavator 100 illustrated in FIG. 2. The excavator 100 has a self-propelling unit 101a that propels using rotation of a crawler track or the like, an operating machine such as a bucket, a boom and an arm, and an operating room, and is provided with a swing unit 101b that can swing about a swing axis oriented to a predetermined direction relative to the self-propelling unit 101a. The voltage control device 1 mounted on the excavator 100 of the above configuration is provided with a rotating electrical machine of which drive shaft is coupled to a drive shaft of an engine, and is provided with a rotating electrical machine that includes a drive shaft conforming to the swing axis of the swing unit 101b and is used to swing.

(Voltage Control Device)

The voltage control device 1 is provided with a three-phase excitation SR (Switched Reluctance) motor 2 as the rotating electrical machine. A drive shaft of the SR motor 2 is coupled to a drive shaft of an engine 3. In addition, the voltage control device 1 is provided with a PM (Permanent Magnet) motor 4 as a rotating electrical machine used to swing. On the SR motor 2 and PM motor 4, an unillustrated rotation sensor for detecting a rotational speed is provided respectively.

The SR motor 2 and the PM motor 4 are supplied with power from a high-capacitance capacitor 5 composed of an electric double layer capacitor. The capacitor 5 also has a function to store electric power generated by the SR motor 2 and the PM motor 4.

The SR motor 2 is connected to an SR driver 6, which is an inverter of the SR motor. The SR driver 6 is connected in parallel to an SR condenser 7 composed of a film condenser suitable for waveform shaping and surge absorption. To the SR condenser 7, a voltage converter 8 for boosting and outputting voltage of the capacitor 5 is connected in parallel.

(Voltage Converter)

Figure 3:
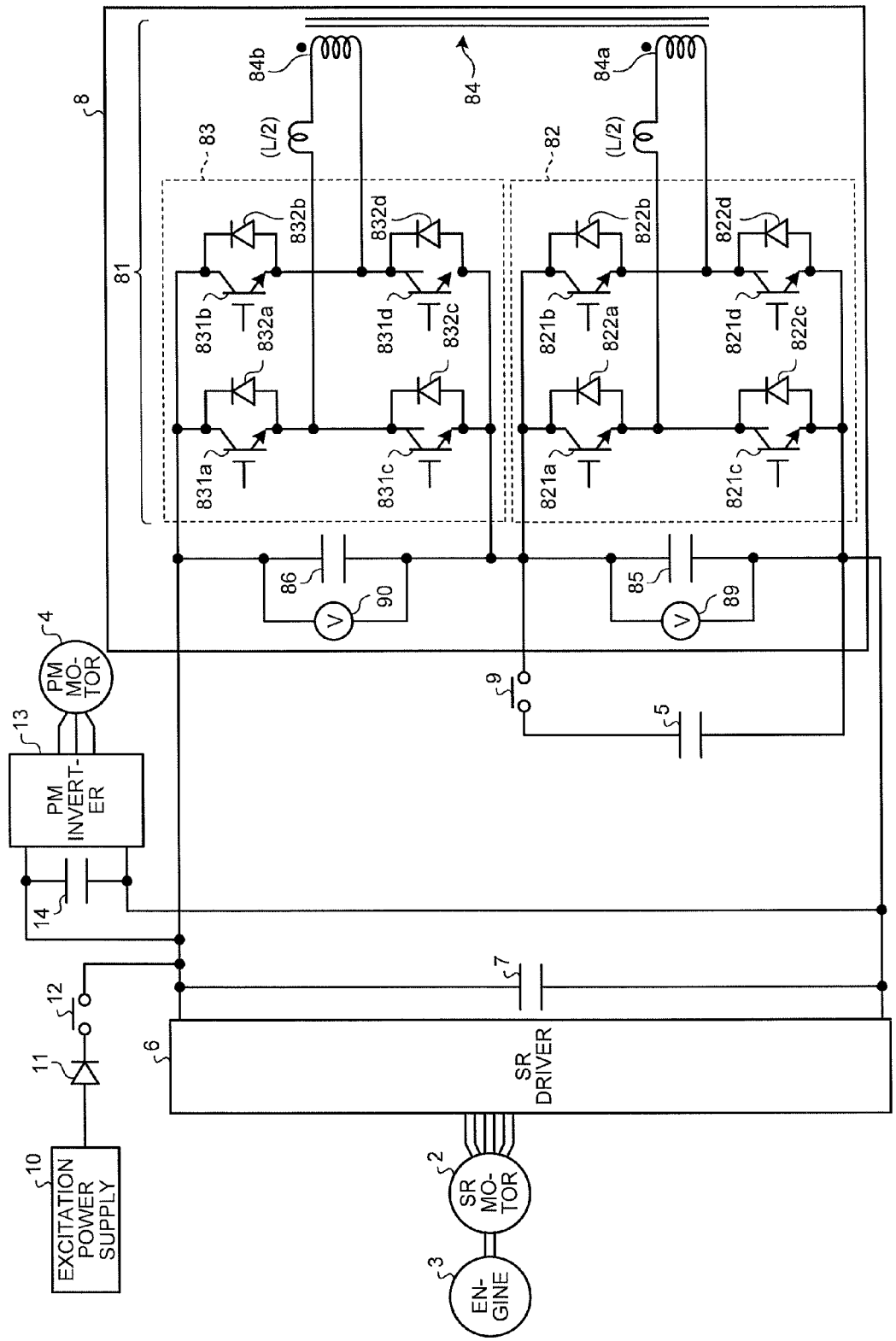
FIG. 3 is a circuit diagram illustrating a configuration of the voltage converter.

FIG. 3 is a circuit diagram illustrating a configuration of the voltage converter 8. As illustrated in FIG. 3, the voltage converter 8 includes a transformer coupled booster 81 with additive polarity which is formed by AC coupling two voltage source inverters via a transformer 84. The transformer coupled booster 81 includes two voltage source inverters which are a lower inverter 82 and an upper inverter 83. Further, the transformer coupled booster 81 includes the transformer 84 that couples alternating-current sides of the lower inverter 82 and upper inverter 83.

The lower inverter 82 is composed, as switching devices of energization switching, of a total of four bridge-connected IGBTs (insulated gate bipolar transistors) 821a, 821b, 821c and 821d, which are provided as two for each of upper and lower arms. Diodes 822a, 822b, 822c and 822d that apply reflux current generated at the time of energization switching are connected in parallel to the IGBTs 821a, 821b, 821c and 821d, respectively. On the other hand, the upper inverter 83 has four IGBTs 831a, 831b, 831c and 831d as the switching devices. Diodes 832a, 832b, 832c and 832d are connected in parallel to the IGBTs 831a, 831b, 831c and 831d, respectively.

In the lower and upper inverters 82 and 83, a positive direct-current terminal of the lower inverter 82 and a negative direct-current terminal of the upper inverter 83 are connected in series so as to have the additive polarity. Voltage externally applied to the transformer coupled booster 81 is divided by the lower inverter 82 and the upper inverter 83.

A condenser 85, mainly aimed at the surge absorption, is connected in parallel to the lower inverter 82. A capacitance of the condenser 85 is remarkably smaller than the capacitance of the capacitor 5. A low-capacitance condenser 86 which is used in surge absorption is also connected in parallel to the upper inverter 83 as in the case of the lower inverter 82. It is preferable that the capacitance of the condenser 85 is higher than that of the condenser 86. This is because an amount of surge occurring in the condenser 85, which is on a side connected to wiring getting out of the voltage converter 8, is larger than the amount of surge occurring in the condenser 86. Moreover, there is an advantage of realizing a compact space because it is not necessary to make the capacitance of the condenser 86 unnecessarily high by suppressing the capacitance of the condenser 86.

The lower inverter 82 is connected to a coil 84a of the transformer 84. On the other hand, the upper inverter 83 is connected to a coil 84b of the transformer 84. When rated voltages of direct-current voltages of the lower inverter 82 and the upper inverter 83 are substantially the same, it is preferable that a turns ratio between the coils 84a and 84b is set to 1:1. Therefore, the turns ratio between the coils 84a and 84b is set to 1:1 in this embodiment; however, the turns ratio may be appropriately changed.

The transformer 84 has a constant leak inductance (referred to as L). In the voltage converter 8, the leak inductance is equally divided to be L/2 on a coil 84a side and L/2 on a coil 84b side. The transformer 84 transmits electric power temporarily stored in the leak inductance to the capacitor 5 or the like by high-speed switching control of the lower inverter 82 and the upper inverter 83. In general, it is known that the leak inductance increases in the transformer when a gap between a primary coil and a secondary coil gets larger. Therefore, when forming the transformer, this is often formed such that the primary coil and the secondary coil closely adhere to each other. On the other hand, in this embodiment, a desired leak inductance is willingly formed by adjusting the gap between the primary and secondary coils, that is to say, the gap between the coils 84a and 84b. Meanwhile, it is also possible to add the inductance outside the transformer 84.

(Configuration of Connection with Voltage Converter)

The condenser 85 of the voltage converter 8 is connected in parallel to the capacitor 5. Between the capacitor 5 and the condenser 85, a contactor 9 is connected in series. When the contactor 9 is connected, the voltage converter 8 increases the voltage (primary side voltage) of the capacitor 5 and supplies the increased voltage (secondary side voltage) to the SR motor 2 and the PM motor 4.

The voltage converter 8 is connected in series to an excitation power supply 10 that excites the SR motor 2 on the secondary side. Here, a reason for providing the excitation power supply 10 on the voltage control device 1 will be described. In general, the SR motor 2 has characteristics to generate large regenerative energy when supplied with electric energy, and does not operate as an electric generator by simply rotating and driving the rotor inside. In order to allow the SR motor 2 with the above characteristics to operate as an electric generator, the coil in the SR motor 2 needs to be excited in advance. However, at start-up of the engine 3, an electric charge of the SR condenser 7 is zero, and the SR motor 2 cannot be excited by the capacitor 5 by turning on the contactor 9 at the start-up of the engine 3. Thus, in this embodiment, the excitation power supply 10 is provided to excite the SR motor 2 at the start-up of the engine 3.

Between the voltage converter 8 and the excitation power supply 10, a diode 11 and a relay 12 are connected in series. The diode 11 blocks the excitation power supply 10 when the voltage of the SR condenser 7 becomes larger than the voltage of the excitation power supply 10. Also, the relay 12 controls power on and power off of the excitation power supply 10 by on/off operation.

The PM motor 4 is connected to a PM inverter 13. The PM inverter 13 is connected in parallel to a PM condenser 14 composed of a film condenser. The voltage converter 8 is connected in parallel to the PM condenser 14.

Between the SR motor 2 and the SR driver 6, a current sensor 15 is connected in series. Also, between the PM motor 4 and the PM inverter 13, a current sensor 16 is connected in series.

Voltmeters 17, 18, 19, 89 and 90 serving as voltage sensors are connected in parallel to the capacitor 5, the SR condenser 7, the PM condenser 14, and the condensers 85 and 86, respectively. An insulation sensor 20 is connected to the capacitor 5.

(Controller)

The voltage control device 1 is provided with a controller 21. The controller 21 has a vehicle body control unit 22 that performs vehicle body control of the excavator 100, an SR motor control unit 23 that controls a speed and torque of the SR motor 2 by controlling the SR driver 6, a PM motor control unit 24 that controls a rotation speed of the PM motor 4 by controlling the PM inverter 13, a voltage converter control unit 25 that controls the voltage converter 8, and a contactor control unit 26 that controls on/off of the contactor 9.

Figure 4:
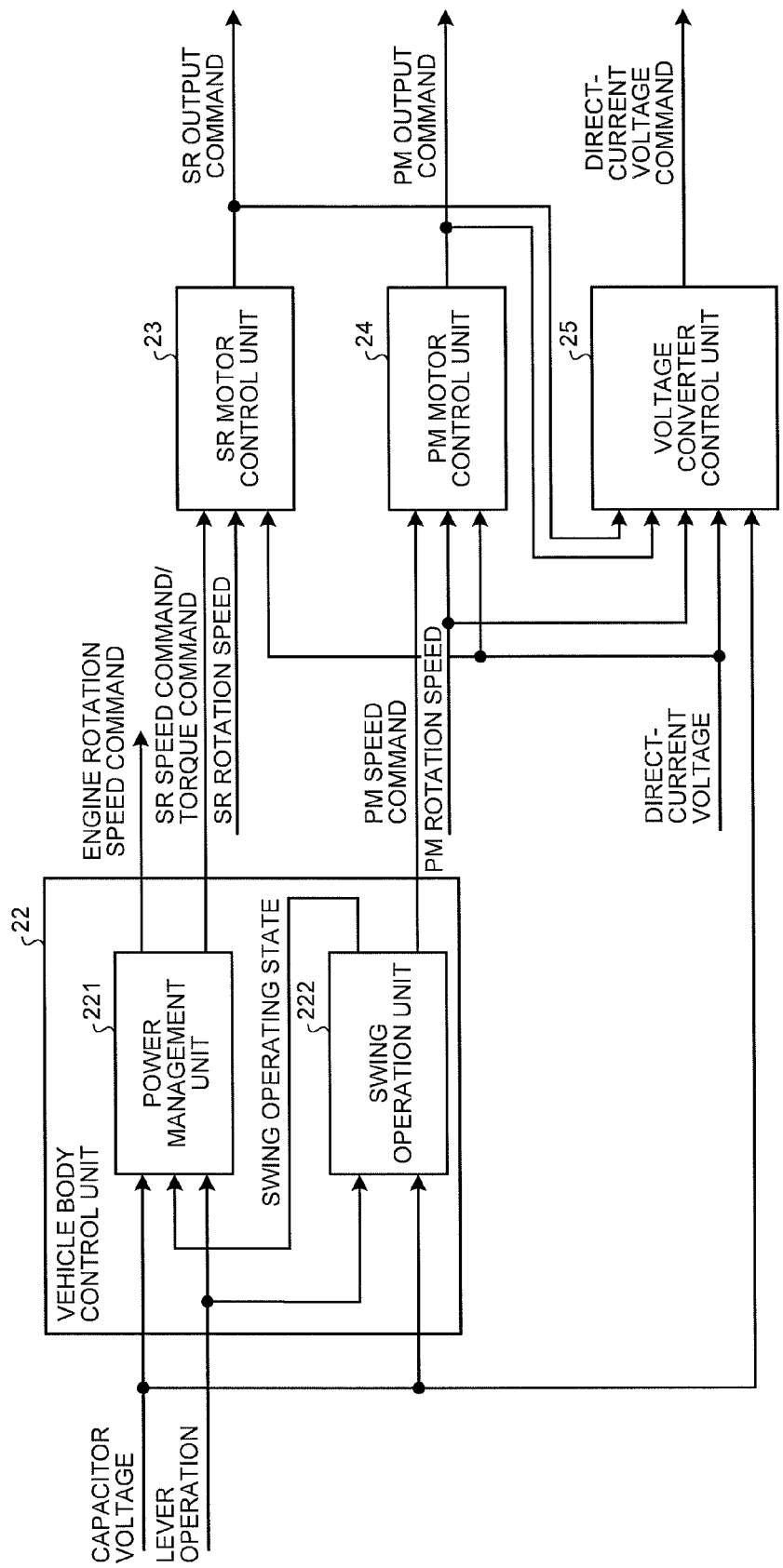
FIG. 4 is a block diagram illustrating control by a controller.

FIG. 4 is a block diagram illustrating control of the controller 21. The vehicle body control unit 22 of the controller 21 has a power management unit 221 that generates operation commands of the engine 3 and the SR motor 2, and a swing operation unit 222 generates an operation command of the PM motor 4, and performs the vehicle body control based on the voltage of the capacitor 5 and operation of an operation lever Lv by an operator. The power management unit 221 generates an engine speed command according to the voltage of the capacitor 5, an operating state of the operation lever Lv and a swing operating state transmitted from the swing operation unit 222, and outputs the command to the engine 3. The power management unit 221 also generates a speed command and a torque command of the SR motor 2 and outputs the commands the SR motor control unit 23. Further, the swing operation unit 222 generates a speed command of the PM motor 4 according to the voltage of the capacitor 5 and the lever operating state and outputs the command to the PM motor control unit 24.

The SR motor control unit 23 generates an SR output command which is an operation command of the SR motor 2 by using the speed command and torque command output from the vehicle body control unit 22, the rotation speed of the SR motor 2, and the direct-current voltage output by the voltage converter 8, and outputs the command to the SR driver 6.

The PM motor control unit 24 generates a PM output command which is an operation command of the PM motor 4 by using the speed command of the PM motor 4 output from the vehicle body control unit 22, the rotation speed of the PM motor 4, and the direct-current voltage output by the voltage converter 8, and outputs the command to the PM inverter 13.

The voltage converter control unit 25, which corresponds to a controller, generates a direct-current voltage command based on the direct-current voltage output by the voltage converter 8, the operation command of the SR motor 2 output by the SR motor control unit 23, the operation command of the PM motor 4 output by the PM motor control unit 24, the rotation speed of PM motor 4, and a capacitor voltage detected by the voltmeter 17, and outputs the command to the voltage converter 8.

(Variable Voltage Control Process of Voltage Converter Control Unit)

Next, referring to a flowchart of FIG. 5, a variable voltage control process procedure by the voltage converter control unit 25 will be explained. Here, the SR motor 2 and PM motor 4 operate between 500 V (a predetermined lower limit voltage Vlow) to 550 V (a predetermined upper limit voltage Vhigh). The predetermined upper limit voltage is set based on a withstand voltage limit of an IGBT element or the like in the transformer coupled booster 81. Further, regarding the predetermined lower limit voltage, when the voltage is equal to or less than this predetermined lower limit voltage, it becomes difficult to obtain preferable motor control with desired motor characteristics, for example.

Figure 5:
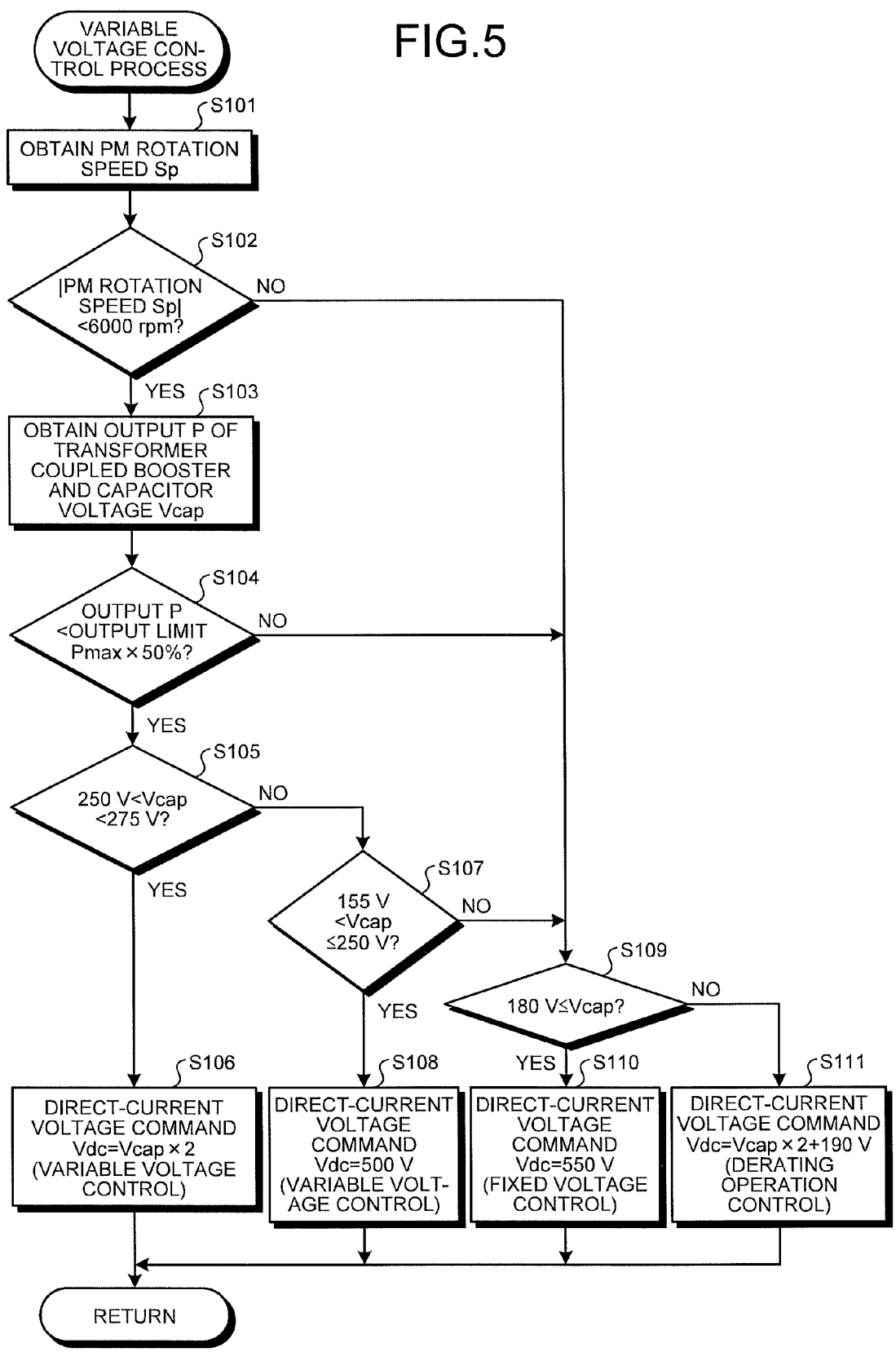
FIG. 5 is a flowchart illustrating a procedure of a variable voltage control process by a voltage converter control unit.

As illustrated in FIG. 5, the voltage converter control unit 25 firstly acquires a PM rotation speed Sp which is a rotation speed of the PM motor 4 (step S101). Then, the voltage converter control unit 25 determines whether or not an absolute value of the PM rotation speed Sp is less than 6000 rpm (a predetermined rotation speed) (step S102). When the absolute value of the PM rotation speed Sp is less than 6000 rpm (Yes in step S102), the voltage converter control unit 25 further acquires an output P and a current capacitor voltage Vcap of the transformer coupled booster 81 (step S103). The output P of the transformer coupled booster 81 can be obtained based on an SR output command output from the SR motor control unit 23 and a PM output command output from the PM motor control unit 24. Here, the output P may be obtained directly from values detected by the voltmeters 18 and 19 and current sensors 15 and 16. Here, the above values such as 500 V (the predetermined lower limit voltage Vlow), 550 V (the predetermined upper limit voltage Vhigh), and 6000 rpm (the predetermined rotation speed) are examples and these values do not set any limitation.

Then, the voltage converter control unit 25 determines whether or not the output P of the transformer coupled booster 81 is less than 50% of an output limit Pmax (a predetermined output) corresponding to the current capacitor voltage Vcap (step S104). Here, the output limit Pmax is assumed as an output limit of a case that the direct-current voltage is 500 V. Here, this does not set any limitation and the output limit Pmax may be assumed as an output limit of a case that the direct-current voltage is 550 V.

Figure 6:
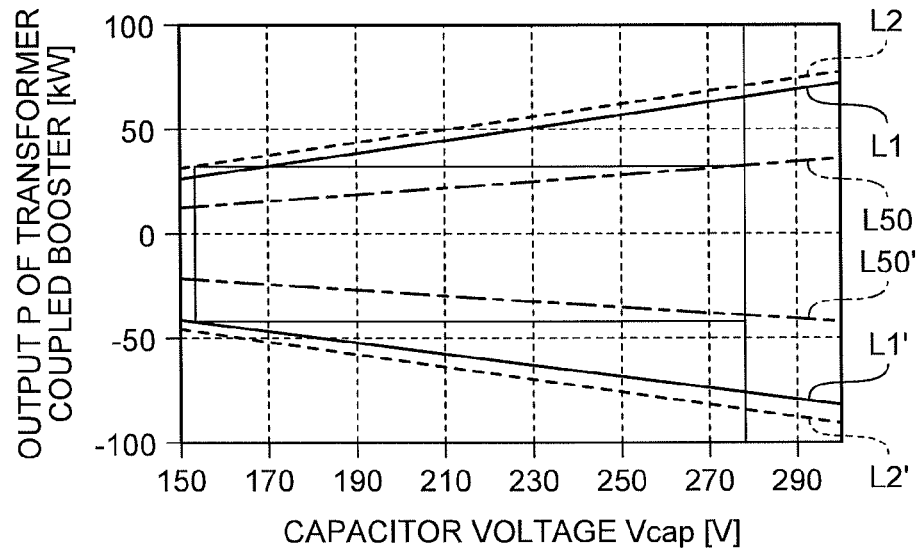
FIG. 6 is a diagram illustrating a relationship between an output limit and a predetermined output with respect to a capacitor voltage.

As illustrated in FIG. 6, the output limit Pmax of a case that the direct-current voltage is 500 V is represented by the characteristic curves L1 and L1' and the output limit Pmax of a case that the direct-current voltage is 550 V is represented by the characteristic curves L2 and L2' corresponding to the capacitor voltage Vcap. Thus, when the direct-current voltage is 500 V, 50% of the output limit Pmax varies as represented as the characteristic curves L50 and L50' corresponding to the capacitor voltage Vcap. The characteristic curves L50 and L50' have a characteristic to reduce corresponding to the reduction of the capacitor voltage Vcap.

After that, the voltage converter control unit 25 determines whether or not a double value of the capacitor voltage Vcap is greater than 500 V and less than 550 V when the output P of the transformer coupled booster 81 is less than 50% of the output limit Pmax corresponding to the current capacitor voltage Vcap (Yes in step S104). In other words, it is determined whether or not the value of the capacitor voltage Vcap is greater than 250 V (a variable control lower limit threshold value Vth2) and less than 275 V (a variable control upper limit threshold value Vth1) (step S105).

When the value of the capacitor voltage Vcap is greater than 250 V and less than 275 V (Yes in step S105), the voltage converter control unit 25 executes variable voltage control so that the direct-current voltage command Vdc for the transformer coupled booster 81 is output as a double value of the capacitor voltage Vcap (step S106) and then the process returns to step S101 to repeat the above process.

On the other hand, when the value of the capacitor voltage Vcap is not greater than 250 V and less than 275 V (No in step S105), the voltage converter control unit 25 further determines whether the double value of the capacitor voltage Vcap is greater than 310 V and less than or equal to 500 V. In other words, the voltage converter control unit 25 determines whether or not the value of the capacitor voltage Vcap is greater than 155 V (the variable control second lower limit threshold value Vth3) and less than or equal to 250 V (the variable control lower limit threshold value Vth2) (step S107).

When the value of the capacitor voltage Vcap is greater than 155 V and less than or equal to 250 V (Yes in step S107), the voltage converter control unit 25 executes variable voltage control so that the direct-current voltage command Vdc for the transformer coupled booster 81 is output as 500 V (the predetermined lower limit voltage Vlow) (step S108) and then the process returns to step S101 to repeat the above process.

On the other hand, when the absolute value of the PM rotation speed Sp is not less than 6000 rpm (No in step S102), when the output P of the transformer coupled booster 81 is not less than 50% of the output limit Pmax corresponding to the current capacitor voltage Vcap (No in step S104), or when the value of the capacitor voltage Vcap is not greater than 155 V and less than or equal to 250 V (No in step S107), it is further determined whether or not the value of the capacitor voltage Vcap is equal to or greater than 180 V (a derating operation threshold value Vth4) (step S109). When the value of the capacitor voltage Vcap is equal to or greater than 180 V (Yes in step S109), the voltage converter control unit 25 executes fixed voltage control so that the direct-current voltage command Vdc for the transformer coupled booster 81 is output as 550 V (the predetermined upper limit voltage Vhigh) (step S110) and then the process returns to step S101 to repeat the above process. On the other hand, when the value of the capacitor voltage Vcap is not greater than or equal to 180 V (No in step S109), the voltage converter control unit 25 executes derating operation to protect the transformer coupled booster 81 (step S111) and then the process returns to step S101 to repeat the above process.

Here, a variable voltage control process in which only the determination process of step S104 is executed may be performed as omitting the above determination process in step S102.

Figure 7:
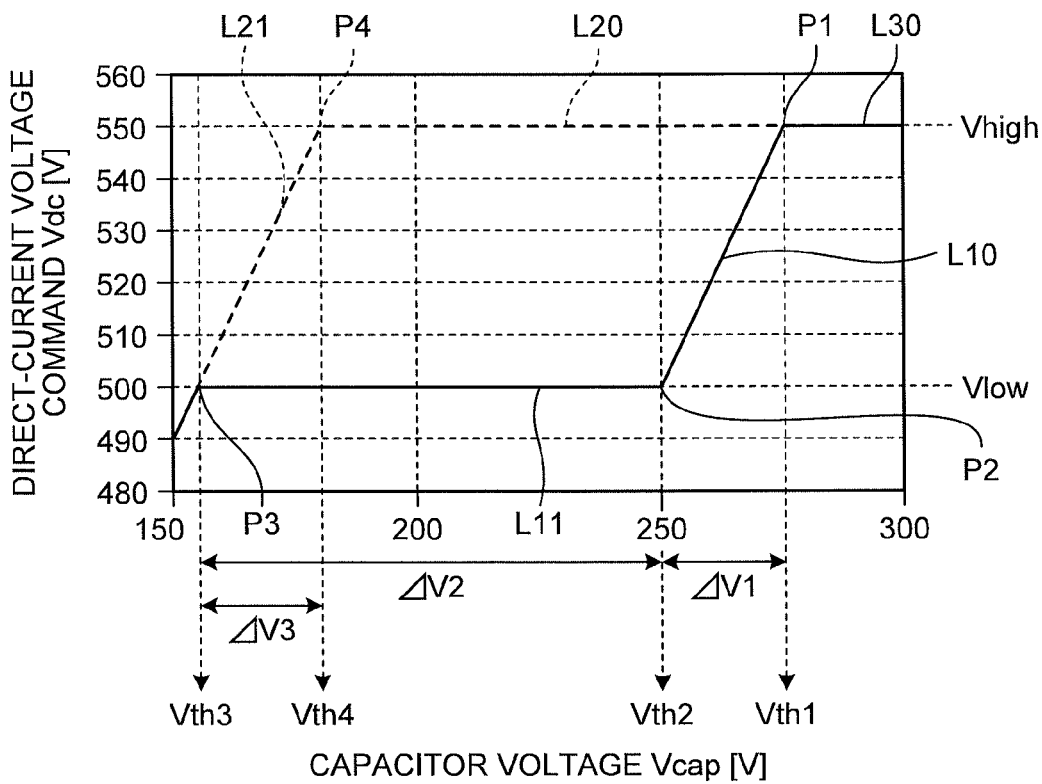
FIG. 7 is a diagram illustrating a relationship of direct-current voltage command values with respect to the capacitor voltage in the variable voltage control process by the voltage converter control unit.

Further, referring to FIG. 7, the variable voltage control process of the voltage converter control unit 25 will be explained. In FIG. 7, the straight lines L10 and L11 are routes of variable voltage control illustrated in steps S106 and S108.

The straight line L10 is a route of the variable voltage control illustrated in step S106. The straight line L10 is a route to execute voltage doubling control to make the direct-current voltage indicated by the direct-current voltage command Vdc two times of the capacitor voltage Vcap in a range ΔV1 that the capacitor voltage Vcap is between the variable control upper limit threshold value Vth1 and variable control lower limit threshold value Vth2. The straight line L10 connects the point P1 where the direct-current voltage indicated by the direct-current voltage command Vdc is 550 V when the variable control upper limit threshold value Vth1 is 275 V and the point P2 where the direct-current voltage is 500 V when the variable control lower limit threshold value Vth2 is 250 V. When the direct-current voltage indicated by the direct-current voltage command Vdc is two times of the capacitor voltage Vcap, the current in the transformer 84 becomes minimum and the total loss in device becomes small. The "total loss in the device" includes a conduction loss of each IGBT, resistance in the transformer 84 (including AC resistance such as DC resistance, skin effect, eddy-current loss or the like) and is proportional to the magnitude of electrical current flown in the transformer 84. In other words, by exciting the voltage doubling control, the loss of the transformer coupled booster 81 can be reduced and the effect of the transformer coupled booster 81 can be improved. According to the present embodiment, since the turns ratio of the coil 84a and coil 84b of the transformer 84 is made to as 1 to 1, the voltage doubling control that obtains a boosting ratio of 1 to 2 is executed. Thus, in a case of a general turns ratio, efficiency of a booster can be improved by executing a fixed boosting ratio control to obtain a boosting ratio corresponding to the turns ratio.

The straight line L11 is a route of the variable voltage control illustrated in step S108. Regarding the straight line L11, a variable voltage control that makes the direct-current voltage indicated by the direct-current voltage command Vdc to be 500 V is executed, in a range ΔV2 where the capacitor voltage Vcap is between the variable control lower limit threshold value Vth2 and the variable control second lower limit threshold value Vth3. It is preferable to execute the voltage doubling control in range ΔV2 in view of the efficiency; however, considering an operating voltage limit (500 V to 550 V) of the SR motor 2 and PM motor 4, a variable voltage control that maintains 500 V constant so as to obtain a boosting ratio which is closest to the turns ratio is executed. Here, the predetermined range of the capacitor voltage Vcap is the range ΔV1 and range ΔV2.

On the other hand, the straight line L20 and straight line L21 are routes of the fixed voltage control, illustrated in step S109, that aims an output of 550 V (the predetermined upper limit voltage Vhigh). Here, regarding the straight line L21, the derating operation is executed so that the direct-current voltage is reduced linearly from the point P4 where the direct-current voltage becomes 550 V at the derating operation threshold value Vth4 when the capacitor voltage Vcap is less than the derating operation threshold value Vth4 (180 V) to the point P3 where the direct-current voltage becomes 500 V when the capacitor voltage Vcap is the variable control second lower limit threshold value Vth3. With this derating operation, the transformer coupled booster 81 is protected.

When the capacitor voltage Vcap is equal to or greater than the variable control upper limit threshold value Vth1, a control that maintains the direct-current voltage to 550 V constant as illustrated by the straight line L30. Further, when the capacitor voltage Vcap is equal to or less than the variable control second lower limit threshold value Vth3, the derating operation is executed.

In other words, the above described straight lines L10 and L11 are routes of the variable voltage control that improves the efficiency of the transformer coupled booster 81. Thus, it is preferable to control on this route of the variable voltage control.

However, when the PM rotation speed Sp is equal to or greater than 6000 rpm, since the PM motor 4 is a permanent-magnet motor, a back electromotive force (induced voltage) is generated by rotation of a rotator. When the rotation speed of the PM motor 4 becomes high, that is equal to or greater than 6000 rpm, since the induced voltage also becomes greater and electricity cannot be flown to the PM motor 4 if the direct-current voltage becomes less than the induced voltage, the PM motor 4 cannot be driven. Thus, when the rotation speed of the PM rotation speed Sp is high, that is equal to or greater than 6000 rpm, it is preferable to maintain a stable driving by executing a fixed voltage control so as to output 550 V (the predetermined upper limit voltage Vhigh) illustrated by the straight line L20 in order to obtain a direct-current voltage that overcomes the induced voltage. Thus, in step S102, it is determined whether or not the PM rotation speed Sp is less than 6000 rpm. Here, it is not preferable to execute a field-weakening control to weaken the large back electromotive force since electricity is separately needed and the motor efficiency is deteriorated.

However, when the PM rotation speed Sp is less than 6000 rpm, since the back electromotive force is small, a measure is not needed to be taken for the back electromotive force and the motor efficiency is not deteriorated even if the variable voltage control is executed. Thus, when the PM rotation speed Sp is less than 6000 rpm, it is preferable to execute the above described variable voltage control.

Further, there is an output limit Pmax in the output from the transformer coupled booster 81. Then, when the direct-current voltage is reduced, the output limit Pmax is also reduced. Thus, in a condition that the output P is large, it is preferable to execute a fixed voltage control with a high direct-current voltage that does not lower the direct-current voltage. Then, for example, if the condition that a variable voltage control is being executed with a direct-current voltage less than 550 V (the predetermined upper limit voltage Vhigh) is the condition of the output limit Pmax of the transformer coupled booster 81, and when a load change is caused in the PM motor 4 or the like, the direct-current voltage cannot be increased to 550 V and the output P of the transformer coupled booster 81 cannot be increased for example. Thus, in step S104, it is determined whether or not the output P of the transformer coupled booster 81 is less than 50% of the output limit Pmax corresponding to current capacitor voltage Vcap.

In other words, when a variable voltage control is executed, even when a load change is generated, it is preferable to execute the voltage control in a condition that there is some allowance so that the output P of the transformer coupled booster 81 can be increased. Specifically, when it is desired to increase output, the output can be increased promptly only by increasing the direct-current voltage. According to the present embodiment, since the load change of the motor is large, the threshold value is set that 50% of the output limit Pmax of the transformer coupled booster 81 is used in a variable voltage control or a fixed voltage control. Thus, when the load change is small, the threshold value may be set larger. For example, 70% of the output limit Pmax of the transformer coupled booster 81 may be set as the threshold value.

Here, the limit in the above steps S102 and S104 when the variable voltage control is executed is set for the use of the PM motor 4 and it is not a limit for the SR motor 2. In other words, since the direct-current voltage (the system voltage) is common to the SR motor 2 and PM motor 4, the SR motor 2 operates under the limit for the PM motor 4.

(Chattering Prevention)

Figure 8:
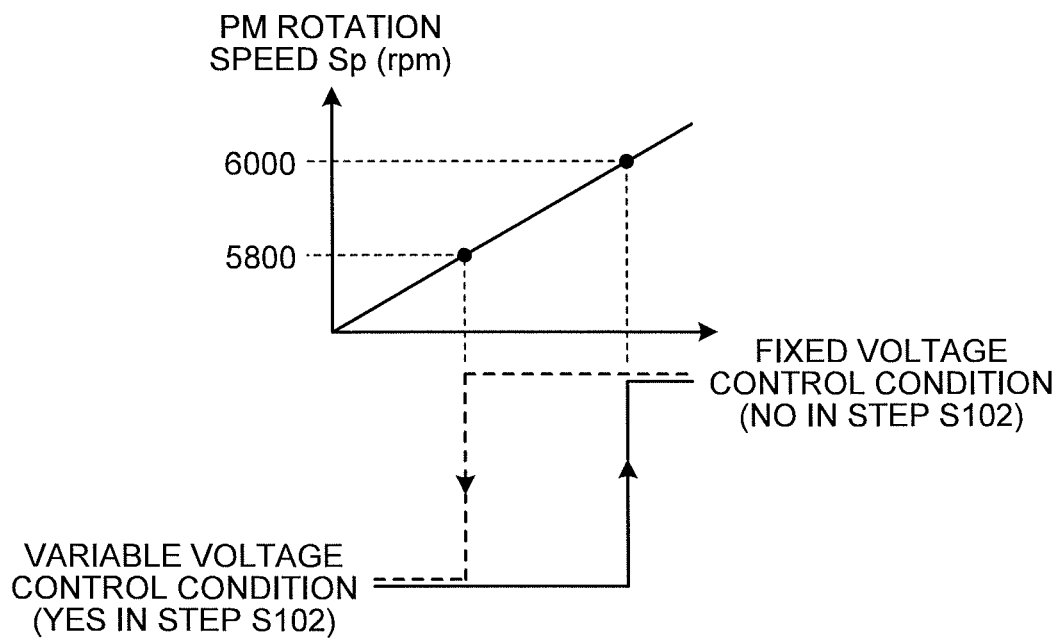
FIG. 8 is a diagram illustrating a hysteresis characteristic in a predetermined rotation speed determination.

In step S102, the determination is made based on a single threshold value of the predetermined rotation speed (6000 rpm). In this case, when the PM rotation speed Sp fluctuates around the predetermined rotation speed, shifting to the variable voltage control condition (steps S106 and S108) and shifting to the fixed voltage control condition (step S109) are often performed and the control condition becomes unstable. Thus, according to the present embodiment, as illustrated in FIG. 8, the predetermined rotation speed (6000 rpm) as a first threshold value and a second threshold value (5800 rpm) which is equal to or less than the predetermined rotation speed are set and hysteresis characteristics are used in condition shifting.

Figure 9:
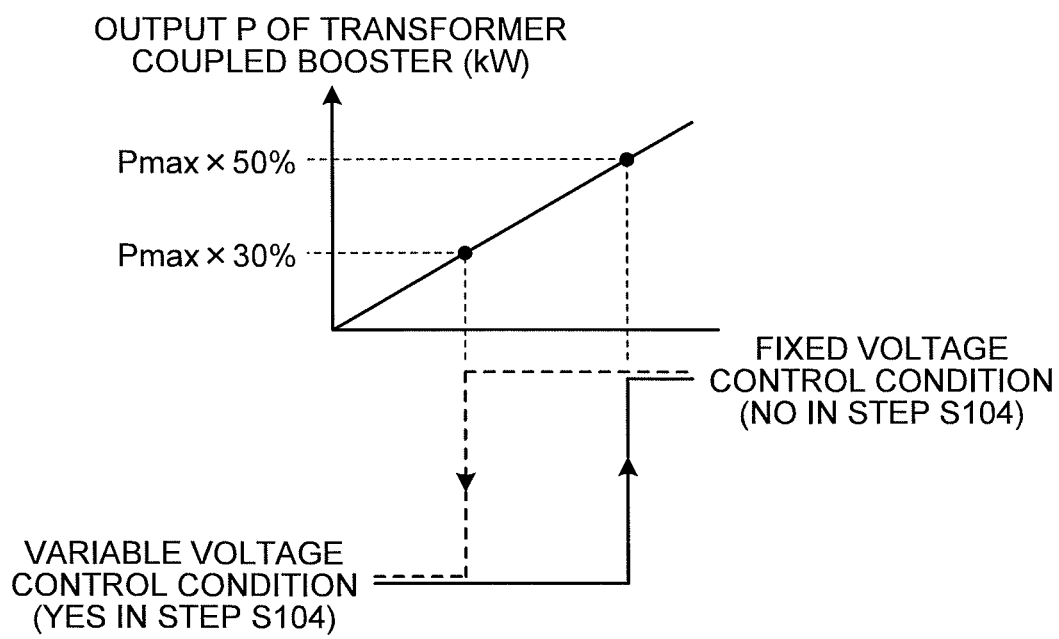
FIG. 9 is a diagram illustrating a hysteresis characteristic in a predetermined output determination by a transformer coupled booster.

Similarly, in step S104, the determination is made based on a single threshold values which is the predetermined output (Pmax×50%). In this case, when the output P fluctuates around the predetermined output (Pmax 50%), shifting to the variable voltage control condition (steps S106 and S108) and shifting to the fixed voltage control condition (step S109) are frequently performed and the control condition becomes unstable. Thus, according to the present embodiment, as illustrated in FIG. 9, a predetermined output (Pmax×50%) as a first threshold value and a second threshold value (Pmax×30%) which is equal to or less than the predetermined output are set and hysteresis characteristics are used when in condition shifting.

(Illustrative Example of Variable Voltage Control by Voltage Converter Control Unit)

Figure 10:
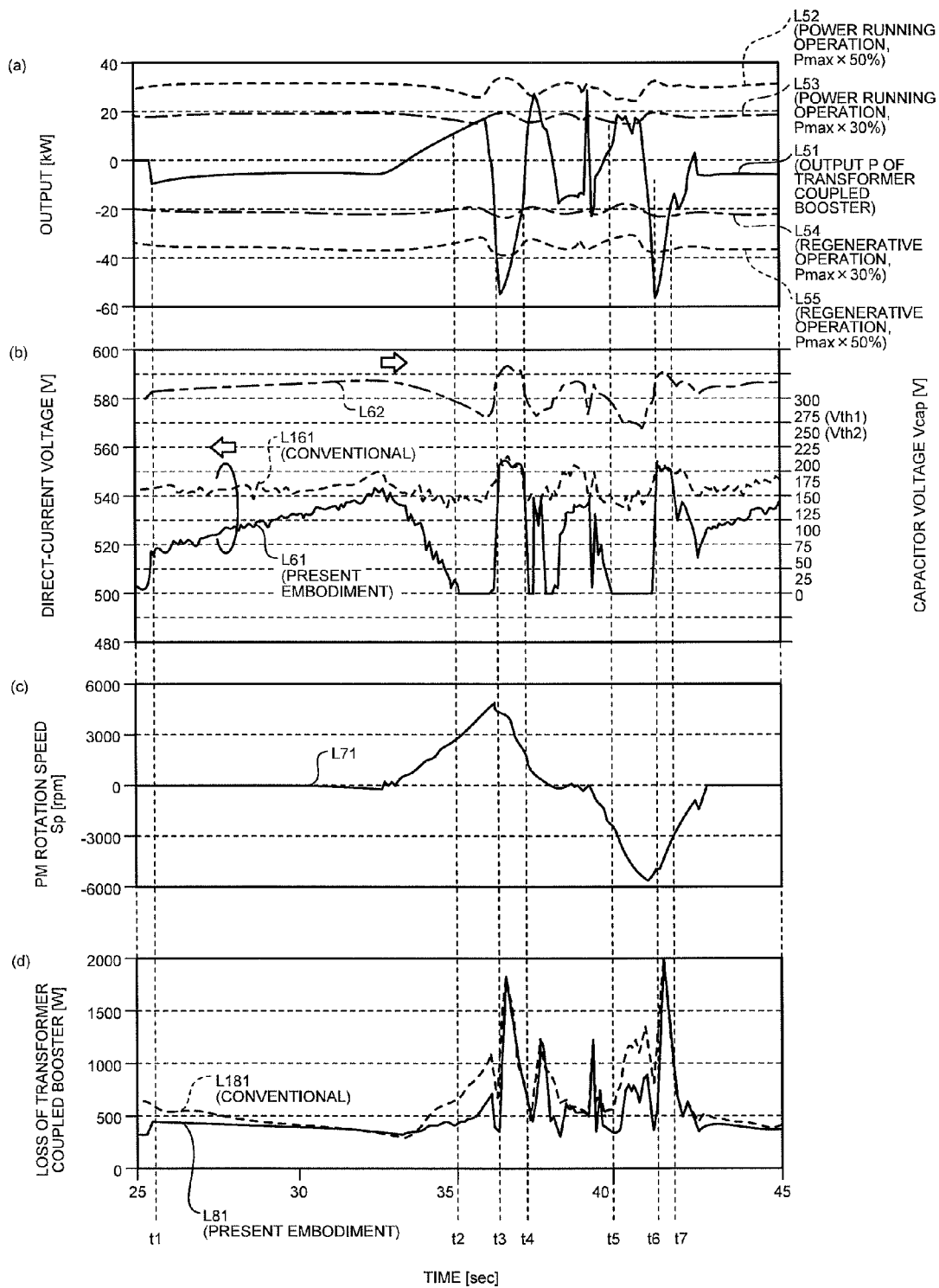
FIG. 10 is a timing chart illustrating an example of time changes of the output from the transformer coupled booster, capacitor voltage, direct-current voltage, PM rotation speed, and a loss in the transformer coupled booster.

FIG. 10 is a timing chart illustrating an example of time changes of the output P of the transformer coupled booster 81, the capacitor voltage Vcap, direct-current voltage, the PM rotation speed Sp, the loss of the transformer coupled booster 81. Here, in FIG. 10(*b*), as a comparison, time changes of a direct-current voltage in a conventional fixed control that always maintains the direct-current voltage to 550 V is included. Further, in FIG. 10(*d*), as a comparison, time changes of a loss of a transformer coupled booster in a conventional fixed control that always maintains the direct-current voltage to 550 V.

The characteristic L51 in FIG. 10(*a*) represents changes of the output P of the transformer coupled booster 81. Further, the characteristics L52 and L55 respectively represent time changes of the predetermined output (Pmax 50%) in a power running operation and a regenerative operation. Further, the characteristics L53 and L54 respectively represent time changes of the threshold value (Pmax×30%) which is less than the predetermined output used in hysteresis control in a power running operation and a regenerative operation.

The characteristic L61 in FIG. 10(*b*) represents time changes of the direct-current voltage of the transformer coupled booster 81 according to the present embodiment. Further, the characteristic L161 represents time changes of a direct-current voltage in a conventional fixed control. Further, the characteristic L62 represents time changes of the capacitor voltage Vcap.

The characteristic L71 in FIG. 10(*c*) represents time changes of the PM rotation speed Sp. Further, the characteristic L81 in FIG. 10(*d*) represents time changes of the loss of the transformer coupled booster 81 according to the present embodiment. Further, the characteristic L181 represents time changes of a loss of the transformer coupled booster 81 in a conventional fixed control.

In FIG. 10, between the time point t1 and the time point t2, a variable voltage control by the voltage doubler (see the characteristic L61) is executed since the PM rotation speed Sp is less than the predetermined rotation speed (6000 rpm), the output P of the transformer coupled booster 81 is also less than the predetermined output (Pmax×50%), and the capacitor voltage Vcap is a value between 250 V (Vth2) and 275 V (Vth1). As a result, as the characteristic L81 in FIG. 10(*d*), the loss of the transformer coupled booster 81 is reduced compared to the conventional characteristic L181.

Between the time point t2 the time point t3, although the PM rotation speed Sp is less than the predetermined rotation speed (6000 rpm), the output P of the transformer coupled booster 81 is also less than the predetermined output (Pmax× 50%), and a variable voltage control is executed, a variable voltage control that obtains the direct-current voltage as 500 V (see characteristic L61) is executed since the capacitor voltage Vcap becomes equal to or less than 250 V (Vth2). Also in this case, regarding the characteristic L81 of FIG. 10(d), the loss of the transformer coupled booster 81 is reduced compared to the conventional characteristic L181.

From the time point t3 to the time point t4, since the output P becomes equal to or greater than the predetermined output (Pmax×50%) in a regenerative operation at time point t3, the fixed voltage control that controls the direct-current voltage to be 550 V is executed. Here, in order to execute a hysteresis process, the fixed voltage control is executed until time point t4 at which the output P becomes equal or less than the threshold value (Pmax×30%) which is less than the predetermined output in a regenerative operation. The characteristic L81 of FIG. 10(d) in this case has the same loss as the conventional characteristic L181.

From the time point t5 to the time point t6, the PM rotation speed Sp is less than the predetermined rotation speed (6000 rpm), the output P of the transformer coupled booster 81 is also less than the predetermined output (Pmax× 50%) and the variable voltage control is executed. After that, from the time point t6 to the time point t7, since it is determined in the hysteresis process that the output P of the transformer coupled booster 81 is equal to or greater than the predetermined output (Pmax×50%), the fixed voltage control is executed. Then, after the time point t7, since it is determined in the hysteresis process that the output P of the transformer coupled booster 81 is less than the predetermined output (Pmax×50%), the variable voltage control is restarted. As a result, between the time points t5 and t6, and the characteristic L81 in FIG. 10(d) after the time point t7 has reduced loss of the transformer coupled booster 81, compared to the conventional characteristic L181.

According to the present embodiment, under a predetermined condition that the PM rotation speed Sp is less than the predetermined rotation speed and the output P of the transformer coupled booster 81 is less than the predetermined output, in a case that the variable voltage control that makes a lower loss of the transformer coupled booster 81 is executed and the predetermined condition is not satisfied, the fixed voltage control that can constantly output a high direct-current voltage of 550 V is to be executed. As a result, the transformer coupled booster 81 can obtain an output corresponding to the load change of the PM motor 4 and the efficiency of the transformer coupled booster 81 can be improved.

REFERENCE SIGNS LIST

1 voltage control device
2 SR motor
3 engine
4 PM motor
5 capacitor
6 SR driver
7 SR condenser
8 voltage converter
9 contactor
10 excitation power supply
11 diode
12 relay
13 PM inverter
14 PM condenser
15, 16 current sensor
17, 18, 19, 89, 90 voltmeter
20 insulation sensor
21 controller
22 vehicle body control unit
23 SR motor control unit
24 PM motor control unit
25 voltage converter control unit
26 contactor control unit
81 transformer coupled booster
82 lower inverter
83 upper inverter
84 transformer
84a, 84b coil
85, 86 condenser
100 excavator
101a self-propelling unit
101b swing unit
221 power management unit
222 swing operation unit
821a, 821b, 821c, 821d, 831a, 831b, 831c, 831d IGBT
822a, 822b, 822c, 822d, 832a, 832b, 832c, 832d diode
L1 and L1', L2 and L2', L50 and L50' characteristic curve
L10, L11, L20, L21, L30 straight line
Lv operation lever
P output
P1 to P4 point
Pmax output limit
Sp PM rotation speed
t1 to t7 time point
Vcap capacitor voltage
Vdc direct-current voltage command
Vhigh predetermined upper limit voltage
Vlow predetermined lower limit voltage
Vth1 variable control upper limit threshold value
Vth2 variable control lower limit threshold value
Vth3 variable control second lower limit threshold value
Vth4 derating operation threshold value
ΔV1, ΔV2 range

The invention claimed is:
1. A voltage control device comprising:
a capacitor configured to supply power to a rotating electrical machine;
an inverter connected to the rotating electrical machine;
a transformer coupled booster including: two voltage source inverters of which direct current terminals are connected in series to have additive polarity; and a transformer configured to couple alternate current terminals of the two voltage source inverters, the transformer having a predetermined leak inductance, wherein one of the two voltage source inverters is connected to the capacitor in parallel, and the transformer coupled booster outputs, to the inverter, a direct-current voltage which is a raised capacitor voltage of the capacitor; and
a controller configured to generate and output an instruction value of the direct-current voltage which is variable corresponding to the capacitor voltage within a predetermined range, in a range less than a predetermined upper limit voltage of the direct-current voltage and not less than a predetermined lower limit voltage of the direct-current voltage at a time the rotating electrical machine is in a drive state and the output of the transformer coupled booster is less than a predetermined output which is less than an output limit of the transformer coupled booster.

2. The voltage control device according to claim 1, wherein
the controller is further configured to generate and output the instruction value of the direct-current voltage which is variable corresponding to the capacitor voltage within the predetermined range, in a range between the predetermined upper limit voltage and the predetermined lower limit voltage of the direct-current voltage at a time the controller determines that a rotation speed of the rotating electrical machine is less than a predetermined rotation speed.

3. The voltage control device according to claim 2, wherein, at a time of determining whether or not the rotation speed of the rotating electrical machine is less than a predetermined rotation speed, the controller is configured to use a hysteresis characteristic in the predetermined rotation speed in a range not greater than the predetermined rotation speed.

4. The voltage control device according to claim 2, wherein the controller is configured to generate and output the predetermined upper limit voltage as the instruction value of the direct-current voltage while the rotating electrical machine is in a drive state, at a time the output of the transformer coupled booster is not less than the predetermined output that is a value less than the output limit, or at a time the rotation speed of the rotating electrical machine is not less than the predetermined rotation speed and the capacitor voltage is not less than a derating operation threshold value.

5. The voltage control device according to claim 2, wherein the predetermined range of the capacitor voltage is a range less than a variable control upper limit threshold value which is a value of a capacitor voltage corresponding to the predetermined upper limit voltage with which a direct-current voltage boosting ratio for the capacitor voltage becomes a most preferable boosting ratio that leads high efficiency of the transformer coupled booster, and
the controller is configured to generate, within the predetermined range of the capacitor voltage, the instruction value of the direct-current voltage that leads the most preferable boosting ratio as the capacitor voltage reduces from the variable control upper limit threshold value, and generate the predetermined lower limit voltage as the instruction value of the direct-current voltage at a time the capacitor voltage is not greater than a variable control lower limit threshold value which is a value of the capacitor voltage at a timing that the direct-current voltage with the most preferable boosting ratio becomes a predetermined lower limit voltage.

6. The voltage control device according to claim 2, wherein, at a time of determining whether or not the output of the transformer coupled booster is less than a predetermined output that is less than an output limit, the controller is configured to use a hysteresis characteristic in the predetermined output in a range not greater than the predetermined output.

7. The voltage control device according to claim 2, wherein the controller is configured to generate the predetermined upper limit voltage as the instruction value of the direct-current voltage at a time the rotating electrical machine is in a drive state, the output of the transformer coupled booster is not less than the predetermined output that is a value less than an output limit, and the capacitor voltage is not less than a derating operation threshold value.

8. The voltage control device according to claim 2, wherein the rotating electrical machine is a permanent-magnet motor.

9. The voltage control device according to claim 1, wherein
the predetermined range of the capacitor voltage is a range less than a variable control upper limit threshold value which is a value of a capacitor voltage corresponding to the predetermined upper limit voltage with which a direct-current voltage boosting ratio for the capacitor voltage becomes a most preferable boosting ratio that leads high efficiency of the transformer coupled booster, and
the controller is configured to generate, within the predetermined range of the capacitor voltage, the instruction value of the direct-current voltage that leads the most preferable boosting ratio as the capacitor voltage reduces from the variable control upper limit threshold value, and generate the predetermined lower limit voltage as the instruction value of the direct-current voltage at a time the capacitor voltage is not greater than a variable control lower limit threshold value which is a value of the capacitor voltage at a timing that the direct-current voltage with the most preferable boosting ratio becomes a predetermined lower limit voltage.

10. The voltage control device according to claim 1, wherein, at a time of determining whether or not the output of the transformer coupled booster is less than a predetermined output that is less than an output limit, the controller is configured to use a hysteresis characteristic in the predetermined output in a range not greater than the predetermined output.

11. The voltage control device according to claim 1, wherein the controller is configured to generate the predetermined upper limit voltage as the instruction value of the direct-current voltage at a time the rotating electrical machine is in a drive state, the output of the transformer coupled booster is not less than the predetermined output that is a value less than an output limit, and the capacitor voltage is not less than a derating operation threshold value.

12. The voltage control device according to claim 1, wherein the rotating electrical machine is a permanent-magnet motor.

13. A voltage control method of a system including: a capacitor configured to supply power to a rotating electrical machine; an inverter connected to the rotating electrical machine; and a transformer coupled booster including: two voltage source inverters of which direct current terminals are connected in series to have additive polarity; and a transformer configured to couple alternate current terminals of the two voltage source inverters, the transformer having a predetermined leak inductance, wherein one of the two voltage source inverters is connected to the capacitor in parallel, and the transformer coupled booster outputs, to the inverter, a direct-current voltage which is a raised capacitor voltage of the capacitor, the voltage control method comprising
generating and outputting an instruction value of the direct-current voltage which is variable corresponding to the capacitor voltage within a predetermined range, in a range less than a predetermined upper limit voltage of the direct-current voltage and not less than a predetermined lower limit voltage of the direct-current voltage at a time the rotating electrical machine is in a drive state and the output of the transformer coupled booster is less than a predetermined output which is less than an output limit of the transformer coupled booster.

14. The voltage control method according to claim 13, further comprising generating and outputting the instruction value of the direct-current voltage which is variable corresponding to the capacitor voltage within the predetermined range, in a range between the predetermined upper limit voltage and the predetermined lower limit voltage of the direct-current voltage at a time a rotation speed of the rotating electrical machine is less than a predetermined rotation speed.

15. The voltage control method according to claim 14, wherein the predetermined range of the capacitor voltage is a range less than a variable control upper limit threshold value which is a value of a capacitor voltage corresponding to the predetermined upper limit voltage with which a direct-current voltage boosting ratio for the capacitor voltage becomes a most preferable boosting ratio that leads high efficiency of the transformer coupled booster, and the voltage control method further comprising:

generating, within the predetermined range of the capacitor voltage, the instruction value of the direct-current voltage that leads the most preferable boosting ratio as the capacitor voltage reduces from the variable control upper limit threshold value; and generating the predetermined lower limit voltage as the instruction value of the direct-current voltage at a time the capacitor voltage is not greater than a variable control lower limit threshold value which is a value of the capacitor voltage at a timing that the direct-current voltage with the most preferable boosting ratio becomes a predetermined lower limit voltage.

16. The voltage control method according to claim 13, wherein the predetermined range of the capacitor voltage is a range less than a variable control upper limit threshold value which is a value of a capacitor voltage corresponding to the predetermined upper limit voltage with which a direct-current voltage boosting ratio for the capacitor voltage becomes a most preferable boosting ratio that leads high efficiency of the transformer coupled booster, and the voltage control method further comprising:

generating, within the predetermined range of the capacitor voltage, the instruction value of the direct-current voltage that leads the most preferable boosting ratio as the capacitor voltage reduces from the variable control upper limit threshold value; and generating the predetermined lower limit voltage as the instruction value of the direct-current voltage at a time the capacitor voltage is not greater than a variable control lower limit threshold value which is a value of the capacitor voltage at a timing that the direct-current voltage with the most preferable boosting ratio becomes a predetermined lower limit voltage.

* * * * *